F. H. WOOLF.
CANDY MACHINE.
APPLICATION FILED DEC. 13, 1907.

971,097.

Patented Sept. 27, 1910.
3 SHEETS—SHEET 1.

Witnesses
Frank A. Fahle
Thomas W. McMeans

Inventor
Frank H. Woolf.
By Bradford & Hood,
Attorneys.

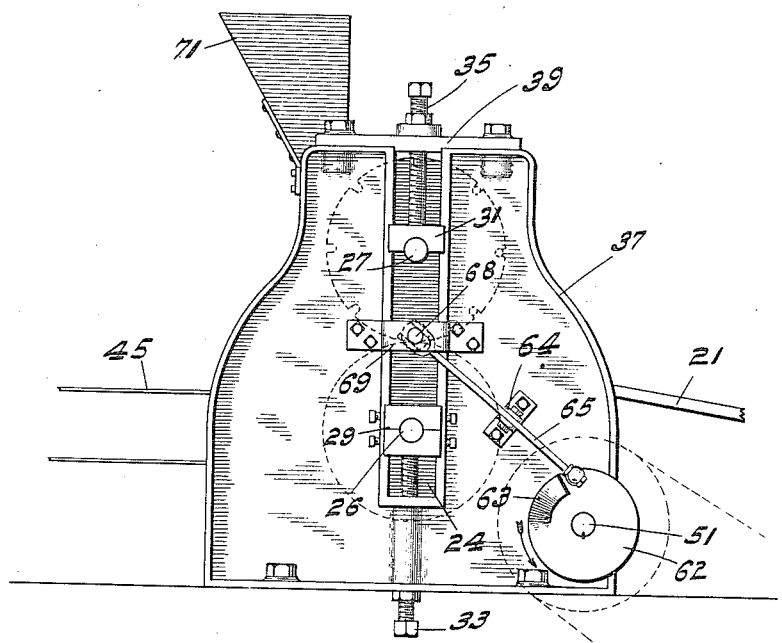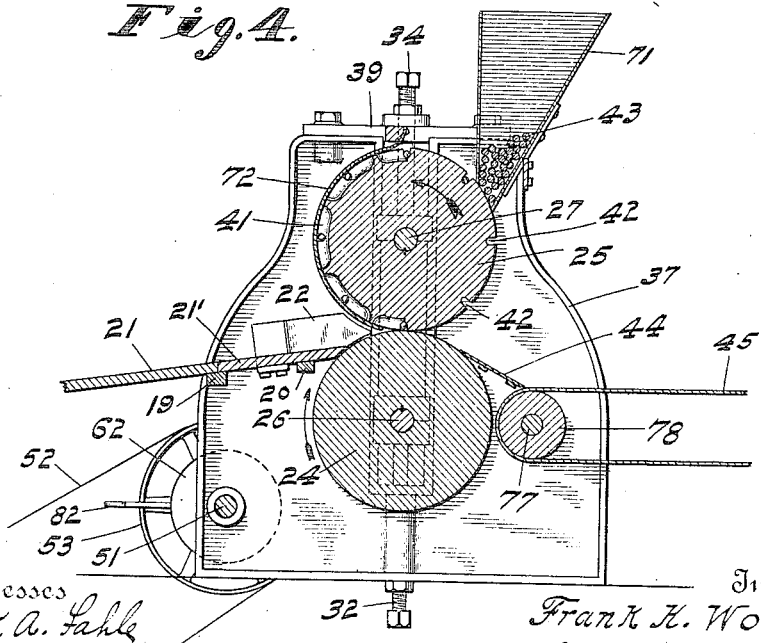

F. H. WOOLF.
CANDY MACHINE.
APPLICATION FILED DEC. 13, 1907.
971,097.
Patented Sept. 27, 1910.
3 SHEETS—SHEET 3.
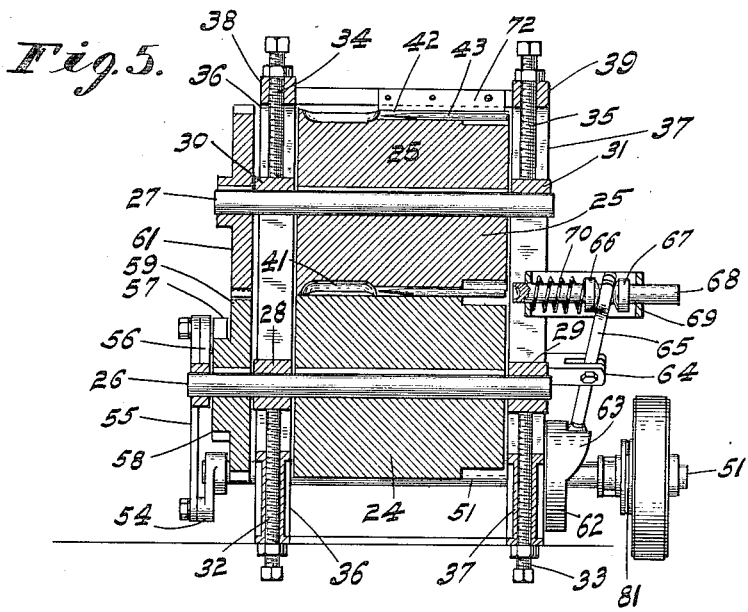
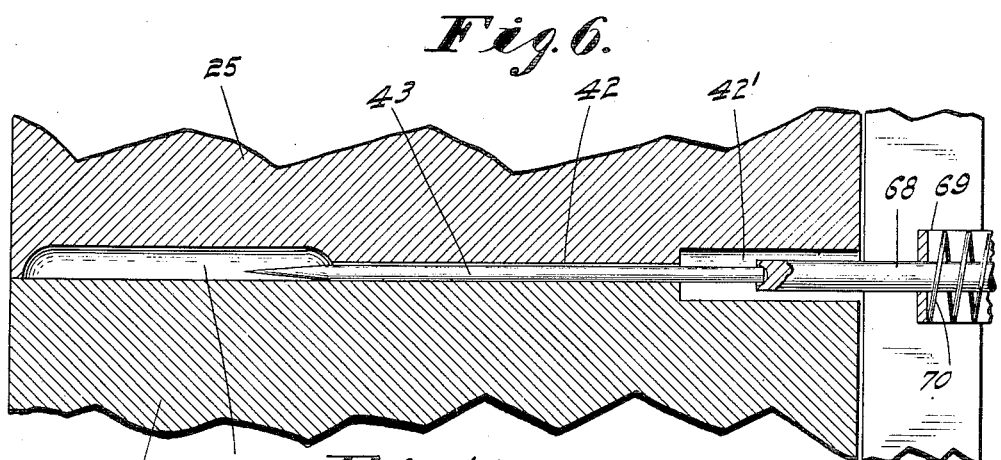
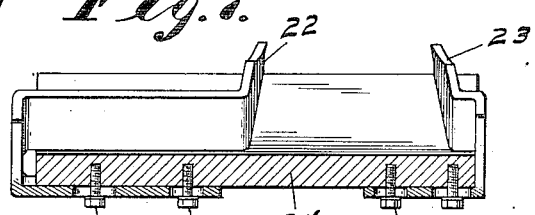
Witnesses
Frank A. Fahle
Thomas H. McMeans
Inventor
Frank H. Woolf
BY Bradford & Hood
Attorneys

UNITED STATES PATENT OFFICE.

FRANK H. WOOLF, OF INDIANAPOLIS, INDIANA, ASSIGNOR TO RACINE ENGINE & MACHINERY CO., OF RACINE, WISCONSIN, A CORPORATION OF WISCONSIN.

CANDY-MACHINE.

971,097.   Specification of Letters Patent.   Patented Sept. 27, 1910.

Application filed December 13, 1907. Serial No. 406,296.

*To all whom it may concern:*

Be it known that I, FRANK H. WOOLF, a citizen of the United States, residing at Indianapolis, in the county of Marion and State of Indiana, have invented certain new and useful Improvements in Candy-Machines, of which the following is a specification.

A certain class of confectionery consists of candy tablets mounted on a small rod or stick by means of which the candy is held while being consumed without the hand of the consumer being brought in contact therewith.

It is an object of my invention to produce this class of confectionery by a machine which will assemble the tablets and the sticks.

My invention comprises a machine which is operative to assemble tablets with sticks, a union or combination being effected between the sticks and the tablets by reason of the sticks being embedded in the tablets, and an additional feature of my invention is the construction of such a machine having such structural features that it is also adapted to form the tables which it assembles with sticks from a mass of material.

It is to be understood that my invention is not limited to a machine intended to work or operate upon candy material alone, as machines constructed according to my invention are adapted for use with any class of material where the object is to combine tablets of material with sticks; and it is to be understood that the words "tablet" and "sticks" as used throughout this specification and in the claims are not limited to any specific form of tablet or sticks, and the word "sticks" or "stick" is used generically to include any form of skewer, pin, etc., whether constructed of wood or metal.

Figure 1:
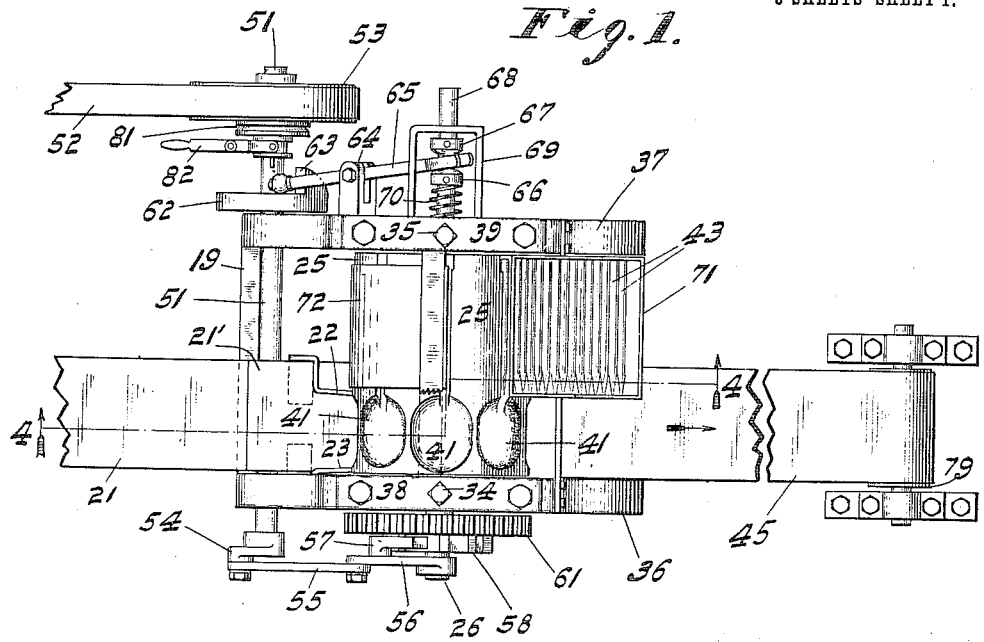
Figure 2:
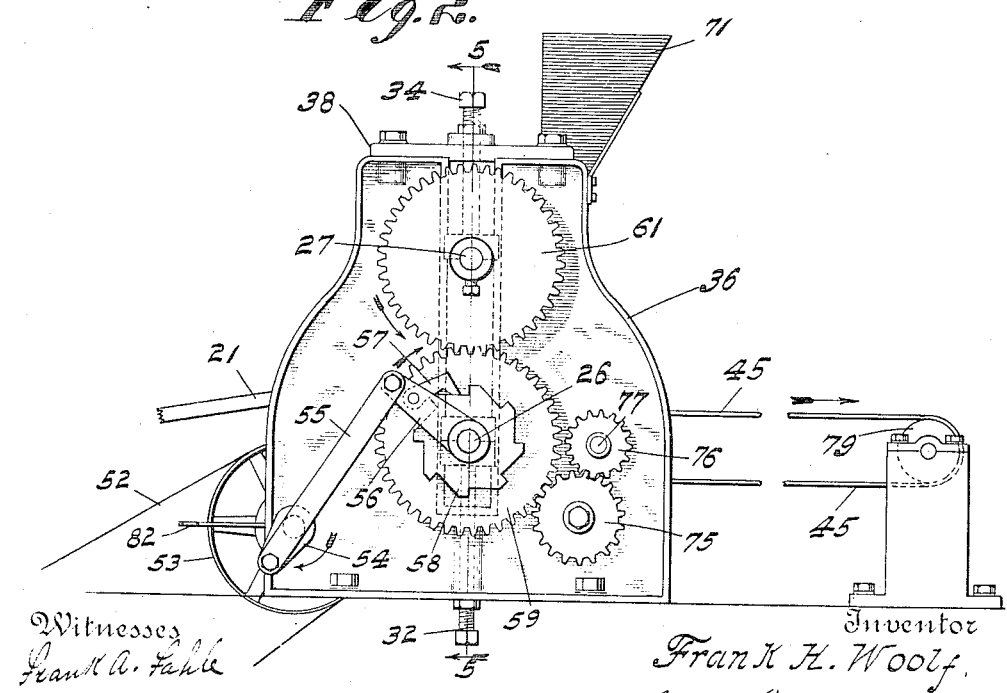

Referring to the accompanying drawings, which are made a part hereof, and on which similar reference characters indicate similar parts, Figure 1 is a top or plan view of a machine embodying my invention in its preferred form, showing also a fragment of the table over which the candy is introduced into the machine and a portion of the carrier by means of which the combined tablets and sticks are carried away; Fig. 2 a side elevation of substantially the same parts shown in Fig. 1; Fig. 3 an elevation of the other side of said machine; Fig. 4 a central vertical sectional view on line 4 4 Fig. 1 as seen when looking in the direction indicated by the arrow; Fig. 5 a vertical sectional view as seen when looking in the direction indicated by the arrows from the dotted line 5 5 in Fig. 2; Fig. 6 a detail or fragmentary view on a considerably enlarged scale similar to a portion of Fig. 5 and illustrating more clearly the manner of introducing the sticks into the candy tablets, and Fig. 7 a detail transverse sectional view through the portion of the table leading to the operating rolls and the guides thereon by which a strip of plastic candy is guided to the rolls.

In the use of this machine a strip of candy or other material is delivered from any suitable source of supply over a table 21 and between guides 22 and 23 and then between a pair of rolls 24 and 25. That portion of said table 21 which is immediately adjacent the rolls, and which carries guides 22 and 23, is preferably made separate from the main body of the table so as to be easily removable. This table portion 21' is therefore (see especially Fig. 4) formed separately from the main portion 21, and is removably held on cross bars 19 and 20 or other suitable supports on the frame. The guides 22 and 23 are adjustable, being provided with slots through which screws 22' and 23' pass, as is best shown in Fig. 7. Each of the rolls 24 and 25, as is best shown in Figs. 3 and 5, is carried by a suitable shaft. The shaft 26 is carried by bearings 28 and 29, and the shaft 27 is carried by bearings 30 and 31, and said several bearings are adjustable by means of adjusting screws 32, 33, 34 and 35. The lower adjusting screws 32 and 33 are mounted in the lower portions of the frame sides 36 and 37, and the upper screws 34 and 35 are mounted in cross bars 38 and 39 secured to the upper portions of said frame sides. By means of these adjusting devices the rolls may be positioned in exactly the right relation to each other, and to the other parts of the machine, as will be readily understood. Those portions of the frame sides 36 and 37 with which the shaft bearings come immediately in contact are in the form of slideways, extending vertically from the top to near the bottom of said frame sides. The cross bars 38 and 39 when in place extend across the tops of these slideways. By removing said bars 38 and 39 the shaft bearings and shafts can be raised out of the machine, together with the rolls, when for any purpose this may be desired.

The roll 24 is preferably an ordinary smooth roll, though it may be provided with mold cavities adapted to register with the mold cavities of roll 25 in order to produce a larger tablet. The roll 25 has mold cavities 41 formed in its surface into which the plastic candy material or other material from which the tablets are to be formed is forced as it passes between the two rolls, and said material is thus molded to the desired form. As best shown in Fig. 1, I prefer to make these mold cavities 41 of an oval shape. The mold cavities, however, do not occupy the full length of the roll, and in the remaining portion of this length I form grooves 42 to receive the sticks or skewer-like rods 43 which are to be assembled with the molded material. That portion 42' of the cavity 42 which is at the opposite end of the roll from the mold cavities, is preferably enlarged somewhat for the purpose of admitting a plunger (68) which operates to thrust the sticks into the material forming the tablets, as will be presently more fully described. Opposite these enlarged groove portions the roll 24 is preferably reduced in size to leave room for this thrusting rod or plunger to operate. As the assembled sticks and tablets leave the rolls, they slide down the table 44 onto a carrier 45, by which they are carried away to the desired point, as will be readily understood. This carrier is long enough so that the candy or other material if it has been operated upon while in a heated and softened condition will become sufficiently cooled and hardened before it reaches the delivery end thereof to enable it to be properly handled.

It is of course necessary with a machine constructed as shown that the rolls should be at rest at the time the plunger operates to drive in a stick. The machine is driven by a main shaft 51 from some suitable source of power (not shown), as for example by a belt 52 running to pulley 53. Upon one end of this shaft 51 is a crank 54, which is connected by means of a link 55 to a swinging arm 56 loosely mounted on the end of shaft 26 of roll 24. Mounted on the arm 56 is a pawl 57, which is adapted to engage with a ratchet wheel 58 also mounted on the shaft 26 and rigidly secured thereto. As the arm 56 is loosely mounted on shaft 26 it does not rotate said shaft; but, as it is swung back and forth on said shaft, the pawl 57 operates the ratchet wheel 58 and rotates the shaft 26 and the roll carried thereby with a step-by-step movement. A spur gear wheel 59 is also mounted on the shaft 26, and a corresponding spur gear wheel 61 is mounted on the shaft 27 of the roll 25, it being of course understood that the gear wheels and rolls are rigidly secured to their corresponding shafts in any suitable or preferred manner, and thus said two rolls are caused to move simultaneously and at co-equal peripheral speeds—the movement period being while the arm 56 is moving toward the right hand, see Fig. 2, and the at-rest period being while the arm 56 is moving in the opposite directions, as said arm is operated through the link 55 from crank arm 54. On the opposite end of the main shaft 51 from that on which the crank arm 54 is mounted, is a wheel 62 provided with a cam. Mounted in a suitable pivot-bearing 64 on the frame of the machine, is a pivoted bar 65, one end of which extends into the path of the cam 63 of wheel 62, while its other end extends up and passes between collars 66 and 67 on a plunger 68. Said plunger 68 is mounted in a support 69 carried by the frame of the machine, and is arranged opposite the point where the surfaces of the two rolls 24 and 25 approach each other, and the mechanism is so timed and arranged that when one of the sticks carried by the groove in roll 25 just reaches the point opposite this plunger, the rolls will be in their at-rest position, and the cam 63 will operate through the bar 65 to drive the plunger inwardly, thus pushing the stick into the tablet of candy or other material which has just been molded. The operating end of this plunger is cup-shaped, as best shown in Fig. 6, so as to fit over the end of the stick being operated upon, and insure a proper engagement between these parts. A spring 70 is arranged to operate in position to the lever 65; and, when the lower end of said lever escapes from the cam 63, said spring will operate to move the plunger 68 backward suddenly, withdrawing it from contact with the stick, and from its position between the two rolls, in time for said rolls to make the next movement under the influence of the ratchet wheel 58, pawl 57 and the parts which drive them. The operation, therefore, is such that a tablet of candy or other material is molded by the rolls as they are moved, the molding rolls cease movement, and a stick is driven in by the plunger 68, which plunger is then withdrawn; after which the rolls are again propelled and the various operations repeated, and so on, continuously, as long as the machine is in operation.

As best shown in Fig. 4 a receptacle or hopper 71 is provided to receive a plurality of the sticks which are to be assembled with the tablets. The mouth of said hopper is placed close to the surface of the roll 25; and, as said roll revolves, the grooves therein will pass the mouth of said hopper, and each of said grooves will receive one of said sticks. As the roll passes on, these sticks are prevented from escaping by a shield 72 which covers the grooved portion of said roll from the top around to the bottom, where they pass in on top of the lower roll 24.

The carrier 45 is an ordinary carrier, and may be driven by means of a spur gear wheel 75 engaging with another spur gear wheel 76 on the shaft 77 of said carrier which carries the driven roll 78 thereof. At the opposite end said carrier passes around a corresponding idle roll or pulley 79.

The driving pulley 53 on the driving shaft 51 is preferably loosely mounted; and an ordinary shifting or friction clutch 81, to be operated by any suitable means, as shifting lever 82, is provided, so that the machine may be thrown into and out of operation at will.

Having thus fully described my said invention, what I claim as new, and desire to secure by Letters Patent, is:—

1. The combination in a candy machine of a suitable frame, molding rolls mounted in said frame, one of said rolls being provided with mold cavities and a groove for each of said mold cavities, means for delivering sticks one by one into said grooves, means for advancing said rolls with a step by step movement, and means adapted to thrust the sticks into the material contained within the mold cavities.

2. The combination in a candy machine of a suitable frame, molding rolls mounted in said frame, one of said rolls being provided with mold cavities and a groove for each of said mold cavities, means for delivering sticks one by one into said grooves, means for advancing said rolls with a step by step movement, and means for thrusting the sticks into the material contained within the mold cavities, the mechanism being timed so that the rolls are at rest when the stick thrusting mechanism is operative.

3. The combination in a candy machine of a suitable frame, rolls mounted in said frame, means for adjusting said rolls toward and from each other, means for driving said rolls with a step by step movement, one of said rolls being provided with grooves, means for introducing sticks into said grooves, and means driven from the same source of power for driving said sticks endwise between the rolls when the latter are at rest.

4. The combination in a candy machine of a suitable frame, molding rolls mounted thereon, gears connected to said rolls whereby they are caused to move synchronously, a ratchet wheel connected to one of said rolls, a movable arm provided with a pawl adapted to engage said ratchet wheel, means for moving said arm forward and back to engage said pawl with said ratchet wheel and to disengage it therefrom to give the rolls alternate periods of movement and rest, one of said rolls being provided with grooves, means for delivering sticks into the grooves, a plunger adapted to move the sticks severally endwise, and means for operating said plunger timed to operate during the at rest periods of the rolls.

5. The combination in a candy machine of molding rolls, one of said rolls being provided with grooves adapted to receive sticks, a plunger for moving said sticks endwise at the proper points, and means for actuating the plunger, said plunger having a cup-shaped operating end adapted to inclose the end of the stick operated upon.

6. The combination in a candy machine, of a receptacle adapted to contain a plurality of separate sticks, molding means adapted to remove said sticks from said receptacle, other molding means adapted to coact with said first mentioned molding means to mold material into tablets, and means for automatically embedding an end of each of said sticks in the tablet designed to be assembled therewith.

7. The combination in a candy machine, of a receptacle adapted to hold a plurality of separate sticks, a molding roll adapted to remove said sticks from said receptacle, other molding means adapted to coact with said molding roll to mold material into tablets, and means for embedding an end of one of said sticks in the tablet designed to be assembled therewith.

8. The combination in a candy machine, of a receptacle adapted to hold a plurality of separate sticks, molding means adapted to remove the sticks directly from said receptacle and to keep them separated from each other, other molding means adapted to coact with said first mentioned molding means to mold material into tablets, and means for assembling the tablets and sticks.

9. The combination in a candy machine, of a receptacle adapted to hold a plurality of separate sticks, a pair of forming rolls adapted to receive the material between them and form it into tablets, while keeping sticks removed from said receptacle separated from each other, and means for projecting sticks into said tablets.

10. The combination in a candy machine, of a receptacle adapted to hold a plurality of separate sticks, a single means adapted to remove sticks directly from said receptacle and retain a plurality of sticks separated one from another while tablets are being assembled therewith, and means for separately assembling tablets with said sticks.

11. The combination in a candy machine of a receptacle adapted to contain a plurality of separate sticks, of a revoluble roll provided with mold cavities and grooves, said grooves being disposed longitudinally of the roll and opening into said mold cavities, a roll located below said first mentioned roll and adapted to rotate therewith, said first mentioned roll being so located with respect to said receptacle that sticks contained in said receptacle will fall into the grooves in said roll separately, a shield to retain the sticks in said grooves, and means to assemble tablets contained in said mold cavities with the sticks contained in said grooves.

12. A roll for candy machines provided with mold cavities and grooves, said grooves being disposed longitudinally of said roll, one being provided for each mold cavity and each groove opening into its respective mold cavity, so that a stick lying in a groove may be pushed endwise into the corresponding mold cavity.

13. The combination in a candy machine, of a receptacle adapted to contain a plurality of separate sticks, means adapted to remove said sticks from said receptacle, other means adapted to coact with said first mentioned means to mold material into tablets, and means for automatically embedding an end of each of said sticks in the tablet designed to be assembled therewith.

14. The combination in a candy machine, of a receptacle adapted to hold a plurality of separate sticks, a roll adapted to remove said sticks from said receptacle, other means adapted to coact with said roll to mold material into tablets, and means for embedding an end of one of said sticks in the tablet designed to be assembled therewith.

15. The combination in a candy machine, of a receptacle adapted to hold a plurality of separate sticks, means adapted to remove the sticks directly from said receptacle and to keep them separated from each other, other means adapted to coact with said first mentioned means to mold material into tablets, and means for assembling the tablets and sticks.

16. In a machine for the manufacture of confectionery articles a suitable frame work, a roll, journaled in said frame work, cavities formed about the periphery of said roll of suitable form to mold candy articles, a longitudinal groove formed in the periphery of said roll connecting with each said cavity, means for feeding sticks into said grooves, means for holding the sticks in the grooves and means for driving said sticks into the mass of candy contained in each molding cavity.

17. In a machine for manufacturing sweetmeats, and confectionery articles, two rolls mounted in a suitable frame work, the lower roll being a pressure roll, and the upper being a molding roll, molding recesses formed in said upper roll to mold sweetmeats, axial grooves formed in the periphery of said latter roll cutting into the said molding recesses, sticks automatically received and carried in said grooves to a proper position to be projected into the mass of the sweetmeat molded in said recesses, a ram actuated by a rapidly rotating cam to project said sticks as shown.

18. In a machine for molding candies, a suitable frame work, a hopper adapted to holds a number of pointed sticks, an opening at the side of said hopper through which the sticks are fed to the machine, a molding roll mounted in said frame work having a molding section and a longitudinally grooved annular section adapted to rotate through and close the opening in said hopper, said longitudinal grooves adapted each to receive one of said sticks, means for holding said sticks in the said grooves until driven into the candy mass molded in the molding section of said roll, means for driving said sticks at proper intervals, means for carrying the product of the machine away and providing thereby cooling facilities as shown.

19. In a candy making machine a suitable frame work, rolls adapted to rotate against each other, recesses in one of the rolls adapted to form the candy fed through the machine, a table provided with adjustable guides over which the candy is fed, means for providing and carrying sticks to the point of contact between said rolls, means for projecting said sticks into the molded candy morsels and means for carrying them away from the machine.

In witness whereof, I have hereunto set my hand and seal at Indianapolis, Indiana, this tenth day of December, A. D. one thousand nine hundred and seven.

FRANK H. WOOLF. [L. S.]

Witnesses:
CHESTER BRADFORD,
THOMAS W. MCMEANS.